United States Patent [19]

Nakagawa et al.

[11] Patent Number: 4,743,635

[45] Date of Patent: May 10, 1988

[54] FRICTION MATERIAL AND METHOD OF MAKING SUCH MATERIAL

[75] Inventors: Mitsuhiko Nakagawa; Fumiaki Nitto, both of Itami, Japan

[73] Assignee: Sumitomo Electric Industries, Ltd., Osaka, Japan

[21] Appl. No.: 15,151

[22] Filed: Feb. 2, 1987

Related U.S. Application Data

[62] Division of Ser. No. 799,404, Nov. 19, 1985, Pat. No. 4,678,818.

[30] Foreign Application Priority Data

Dec. 13, 1984 [JP] Japan ................. 59-263641

[51] Int. Cl.⁴ ..................... C08K 3/08; C08K 3/04
[52] U.S. Cl. ...................... 523/155; 523/149; 523/156; 523/157; 523/158; 523/159
[58] Field of Search ............. 523/149, 155, 156, 157, 523/158, 159

[56] References Cited

U.S. PATENT DOCUMENTS

| | | | |
|---|---|---|---|
| 3,069,758 | 12/1962 | Wulff | 75/229 |
| 3,114,197 | 12/1963 | DuBois et al. | 75/229 |
| 3,891,398 | 6/1975 | Odier | 75/231 |
| 4,415,363 | 11/1983 | Sanftleben et al. | 75/229 |

*Primary Examiner*—Lewis T. Jacobs
*Attorney, Agent, or Firm*—W. G. Fasse; D. H. Kane, Jr.

[57] ABSTRACT

A friction brake material contains fibers, graphite and a binder. All or part of the graphite is physically combined with one or more metals or alloys which are softer than steel to form a first combination or mixture. A separate combination or mixture is formed to include friction increasing fibers in a binder. Both mixtures are then combined to form the friction brake material which has an ability to cause substantially less creaking noise upon brake application as compared to differently prepared friction brake material.

6 Claims, 1 Drawing Sheet

PRIOR ART FIG.2

FRICTION MATERIAL AND METHOD OF MAKING SUCH MATERIAL

This is a divisional of application Ser. No.: 799,404, filed Nov. 19, 1985, now U.S. Pat. No. 4,678,818, issued July 7, 1987.

FIELD OF THE INVENTION

This invention relates to a friction material used for making brake linings for applying braking forces to automobile wheels and the like. More particularly an improved friction material is disclosed for preventing creaking noises which are otherwise produced during the braking action of a disk brake.

DESCRIPTION OF THE PRIOR ART

When a brake disk rotor is braked at low temperatures below 100° C., creaking noises with a low frequency of about 50–500 HZ are often produced immediately before the wheels come to a stop or when a car with an automatic transmission is started or when the brake is released. These creaking noises are produced in organic type friction materials and are noticeable particularly in semimetallic friction materials using steel fiber material.

It has been found that the reason for these creaking noises produced by friction materials including steel, is that the steel and graphite ingredients in a steel type friction material cause so-called "stick slip" at very low speeds. It has also been found that such creaking noises tend to be produced even in organic type friction materials which do not use steel fibers, but have a high graphite content.

To reduce said creaking noises, therefore, it would appear to be effective to reduce the steel fiber content or the graphite content. However, the smaller the amount of steel, the lower the friction coefficient. If the steel content is less than 5% by volume, it is no longer possible to maintain the practical function of friction materials. Further, the smaller the amount of graphite, the lower the wear resistance. If the graphite content is less than 5% by volume, the amount of wear of the friction materials increases substantially. In friction materials not using steel fibers, the addition of graphite is an effective means for increasing wear resistance. Therefore, it is not preferable to reduce the amount of graphite or do away with it.

Japanese Patent Publication No. 22984/1984 discloses that the aforesaid creaking noises may be prevented, if the steel fibers are combined with nickel, zinc, tin, lead or an alloy thereof by melting. This method, however, is expensive.

SUMMARY OF THE INVENTION

Accordingly, an object of the invention is to provide a friction material which reduces creaking noises, contains an amount of graphite required to prevent a degradation of the wear resistance and is also cost-effective.

This invention provides a friction material which is a mixture containing fibers, graphite and one or more metals or alloys which are softer than steel embedded in a binder or matrix material, wherein all or part of said graphite is first mixed with said metal or alloy before further mixing with the fibers and binder.

These objects and other objects, features, aspects, and advantages of the present invention will become more apparent from the following detailed description of the present invention when taken in conjunction with the accompanying drawings.

BRIEF DESCRIPTION OF THE DRAWINGS

FIG. 2 is a schematic sectional view of an example of a conventional friction material.

DESCRIPTION OF THE PREFERRED EMBODIMENTS

Figure 1:
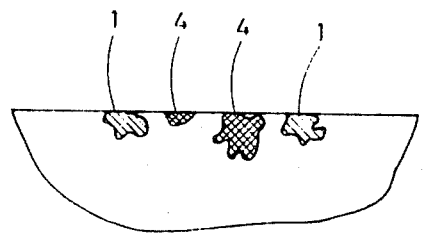
FIG. 1 is a schematic sectional view of an example of a friction material according to this invention.
Figure 1:
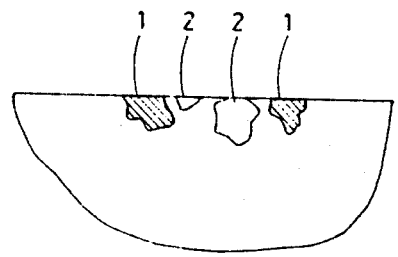

We have found that the above mentioned creaking noises of brake linings can be effectively prevented by first physically mixing all or part of the graphite with one or more metals or alloys, which are softer than steel to prepare a first metal graphite mixture in which the softer metal or alloy is bonded to the graphite. This first softer than steel metal graphite bonded mixture is then further mixed with the fibers and a binder to form a friction material. FIG. 1 shows an example of a friction material according to this invention comprising said bonded mixture 4 of graphite and metal or alloy, and steel fibers 1 in a matrix material. On the other hand, a conventional friction material shown in FIG. 2 contains graphite 2 separate from the steel fibers 1. That is, this invention is characterized in that all or part of the graphite has been first physically mixed and bonded with one or more metals or alloys.

As for metals or alloys which are softer than steel, lead, tin, zinc and copper are effective and brass and bronze, which are alloys thereof, are effective.

There are various methods of physically combining e.g. by mixing and bonding graphite with metal or alloy to form a first bonded mixture which is then further combined with fibers in a matrix to form a second mixture. For example, graphite and metal or alloy may be physically mixed and bonded together by a first binder which intimately bonds the graphite and the metal or metal alloy to each other. Among first binders to be used are rubber, epoxy resin, phenol resin and other organic matter, water glass and other inorganic matter. Further, graphite and metal or alloy may be physically combined together by mixing, pressing and sintering. It is also possible to physically combine graphite and metal or alloy together by plating the graphite with the metal or alloy. Further, graphite and metal or alloy may be physically combined together by melting.

The components which are effective as a frictant or friction causing agent in the friction material of this invention are inorganic fibers of asbestos, glass, rock wool, glass wool and the like, metal fibers such as steel fibers, and organic fibers such as carbon fibers, acrylic fibers treated for flame resistance, and aramid fibers. Further, to ensure a satisfactory friction coefficient and wear resistance, preferably, the friction material contains, on a volume basis, 5–35% of steel fibers or steel powder as a frictant, 10–35% of a further binder or matrix material, and 0.5–15% of metal other than steel, the balance being graphite, and organic and/or inorganic filler.

Functional tests were conducted using friction materials A–E formulated according to Table 1 shown below. In the table 1, samples A–D are examples of the invention and sample E is a control sample.

TABLE 1

| Sample | Formulation (volume percent) | | | | |
|---|---|---|---|---|---|
| | Example of Invention | | | | Control |
| | A | B | C | D | E |
| Steel fiber | 30 | 30 | 32 | 32 | 30 |
| Phenol resin | 25 | 25 | 27 | 27 | 25 |
| Barium sulfate | 12 | 12 | 13 | 13 | 12 |
| Silica | 3 | 3 | 3 | 3 | 3 |
| Combination ⓐ | 30 | | | | |
| Combination ⓑ | | 30 | | | |
| Combination ⓒ | | | 12 | | |
| Combination ⓓ | | | | 25 | |
| Graphite | | | | 13 | 21 |
| Epoxy resin | | | | | 6 |
| Zinc powder | | | | | 3 |

Sample A (example of the invention)

On a volume basis, 5% zinc powder with a grain size of less than 200 mesh, 25% epoxy resin as a first binder, and 70% graphite with a grain size of less than 200 mesh were mixed, and the mixture was maintained in a hot air furnace in a 200° C. atmosphere for 4 hours and cured to provide the softer metal graphite bonding. Thereafter, it was crushed to provide a first bonded mixture or combination ⓐ. This first bonded combination or mixture ⓐ was further combined with a second mixture of steel fiber, phenol resin as a second binder or matrix material, barium sulfate and silica prepared according to Table 1. The result of combining the first and second mixtures was press-molded and after-cured to thereby prepare a friction material having a porosity of about 5%.

Sample B (example of the invention)

On a volume basis, 5% lead-tin alloy powder with a grain size of less than 200 mesh, 25% epoxy resin as a first binder, and 70% graphite with a grain size of less than 200 mesh were mixed, and the mixture was maintained in a hot air furnace in a 200° C. atmosphere for 4 hours and cured to provide the softer metal graphite bonding. It was crushed to provide a first combination or mixture ⓑ, which is then further combined with a second mixture including steel fiber, phenol resin as a second binder or matrix material, barium sulfate and silica prepared according to Table 1. The result of combining the first and second mixtures was press-molded and after-cured to thereby prepare a friction material having a porosity of about 5%.

Sample C (example of the invention)

On a volume basis, 70% graphite and 30% zinc powder were mixed together with a caking agent. The mixture was pressed and sintered to provide the softer metal graphite bonding and then crushed to provide a first bonded combination or mixture ⓒ which is then further combined with a second mixture of steel fiber, phenol resin as a matrix material, barium sulfate, silica and graphite prepared according to Table 1. The result of combining the first and second mixtures was press-molded and after-cured to thereby prepare a friction material having a porosity of about 5%. The term "caking agent" means a molding auxiliary, such as an organic substance, e.g. paraffin or camphor.

Sample D (example of the invention)

Porous graphite was impregnated with molten zinc to provide the softer metal graphite bonding and then crushed to form a first bonded combination or mixture ⓓ of 70% graphite and 30% zinc, on a volume basis. This first bonded combination or mixture ⓓ was then further combined with a second mixture of steel fiber, phenol resin as a matrix material, barium sulfate and silica prepared according to Table 1. The result of combining the first and second mixtures was press-molded and after-cured to thereby prepare a friction material having a porosity of about 5%.

Sample E (control)

Steel fibers, phenol resin, barium sulfate, silica, graphite, epoxy resin and zinc powder were mixed according to the formulation shown in Table 1. Under the following condition, it was press-molded and after-cured to thereby prepare a friction material having a porosity of about 5%.

Press condition: Putting the mixture in a mold heated to 150° C. and pressing it therein for 10 minutes.

In addition, the mold was a force-cut type mold designed for a constant volume, and the mixture was charged into the mold with sufficient accuracy to ensure that the porosity of the friction material was 5%. The mixture was maintained in a hot air furnace in a 250° C. atmosphere for 10 hours and then after-cured.

Results of Functional Tests

Functional tests in creaking noises were conducted using said friction material A–E in ordinary automobiles.

The magnitude of the creaking noises produced was evaluated as shown in Table 2 below.

TABLE 2

| Friction Material Class | | Rotor Temperature (°C.) | Deceleration (g) | | | | | |
|---|---|---|---|---|---|---|---|---|
| | | | 0.05 | 0.10 | 0.15 | 0.20 | 0.25 | 0.30 |
| Example of the Invention | A | 30 | 2 | 2 | 0 | 1 | 1 | 0 |
| | | 50 | 2 | 1 | 1 | 0 | 0 | 0 |
| | | 70 | 1 | 0 | 0 | 0 | 0 | 0 |
| | | 100 | 0 | 0 | 0 | 0 | 0 | 0 |
| | B | 30 | 2 | 2 | 2 | 1 | 1 | 0 |
| | | 50 | 2 | 1 | 2 | 1 | 1 | 0 |
| | | 70 | 0 | 0 | 1 | 0 | 0 | 1 |
| | | 100 | 0 | 0 | 1 | 0 | 0 | 0 |
| | C | 30 | 2 | 1 | 1 | 1 | 1 | 0 |
| | | 50 | 1 | 1 | 1 | 1 | 0 | 0 |
| | | 70 | 1 | 1 | 1 | 0 | 0 | 0 |
| | | 100 | 0 | 1 | 0 | 0 | 0 | 0 |
| | D | 30 | 1 | 1 | 1 | 1 | 0 | 0 |
| | | 50 | 1 | 1 | 1 | 0 | 0 | 0 |
| | | 70 | 1 | 1 | 1 | 1 | 0 | 0 |
| | | 100 | 0 | 0 | 0 | 0 | 0 | 0 |
| Control | E | 30 | 3 | 2 | 2 | 2 | 1 | 0 |
| | | 50 | 3 | 3 | 3 | 3 | 2 | 1 |
| | | 70 | 2 | 2 | 2 | 0 | 2 | 2 |
| | | 100 | 2 | 2 | 1 | 0 | 0 | 0 |

The initial velocity of the automobile was 20 Km/hr., and the rotor temperature Ti (°C.) was changed in 4 steps as shown in Table 2. Further, the deceleration $\beta$ (g) was changed in 6 steps for each temperature step, as shown in Table 2. Thus, brake tests were conducted once for each combination of values, and the magnitude of the creaking sound was evaluated. Cracking noises were evaluated by conducting a functional test in which the driver evaluated it with his ears, rating the noises at 3, 2 or 1 in the decreasing order of magnitude, using 0 to indicate the absence of any cracking noises.

It can be seen from Table 2 that the friction materials according to the invention are effective in preventing creaking noises. Further, fade tests were conducted for the friction materials using a dynamometer.

When the initial velocity of the automobile was 100 Km/hr. and the deceleration was 0.45 g, the brake was applied 10 times at intervals of 35 seconds to determine the friction coefficient ($\mu$). Each friction material showed its minimum value at the 6th braking, the respective values being as follows.

Sample A (example of the invention): 0.23
Sample B (example of the invention): 0.24
Sample C (example of the invention): 0.26
Sample D (example of the invention): 0.28
Sample E (control): 0.19

The above results prove that the fade resistance and creaking noise reduction of the examples of the invention are superior to the fade resistance and creaking noise reduction of the control example. In addition, concerning the samples C and D it is to be noted that the improvement of the fade resistance is particularly remarkable since substantially no organic matter was used in producing the friction brake material.

As described above, friction materials according to the invention are effective in preventing creaking noises and are superior in fade resistance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for manufacturing a friction material, comprising the following steps:
    (a) separately preparing a combination of graphite and one or more metal or metal alloy which is softer than steel in such a way that the graphite and metal alloy enter into an intimate bond with each other,
    (b) providing friction causing fibers and a binder as a matrix material,
    (c) embedding said combination of already intimately bonded graphite and metal or metal alloy and said friction causing fibers in said binder matrix material, and
    (d) molding and curing said binder matrix material for forming said friction material.

2. The method of claim 1, wherein said step of preparing said combination of graphite and one or more metal or metal alloy softer than steel is performed by sintering said graphite and said metal or metal alloy softer than steel.

3. The method of claim 1, wherein said step of preparing said combination of graphite and one or more metal or metal alloy softer than steel is performed by impregnating a porous graphite with molten metal or alloy softer than steel.

4. The method of claim 1, wherein said step of preparing said combination of graphite and one or more metal or metal alloy softer than steel is performed by embedding the graphite and metal or metal alloy in a first binder.

5. The method of claim 1, wherein said metal or metal alloy softer than steel is selected from a group consisting of lead, lead alloys, zinc, zinc alloys, tin and tin alloys.

6. The method of claim 1, wherein said friction causing fibers are selected from the group consisting of asbestos fibers, glass fibers, rock wool fibers, slug wool fibers, steel fibers, carbon fibers, acrylic fibers treated for flame resistance, and aramid fibers.

* * * * *